(12) United States Patent
Cossement et al.

(10) Patent No.: US 7,582,274 B2
(45) Date of Patent: Sep. 1, 2009

(54) CARBON NANOSTRUCTURE CATALYST SUPPORT

(75) Inventors: Daniel Cossement, Montreal (CA); Richard Chahine, Trois-Rivieres (CA); Tapan K. Bose, Trois-Rivieres (CA)

(73) Assignee: Her Majesty the Queen in right of Canada, as represented by the Minister of National Defence of her Majesty's Canadian Government, Ottawa, Ontario (CA)

( * ) Notice: Subject to any disclaimer, the term of this patent is extended or adjusted under 35 U.S.C. 154(b) by 365 days.

(21) Appl. No.: 10/849,932

(22) Filed: May 21, 2004

(65) Prior Publication Data
US 2005/0260117 A1    Nov. 24, 2005

(51) Int. Cl.
*D01F 9/12* (2006.01)
*C01B 31/34* (2006.01)

(52) U.S. Cl. ............... 423/447.3; 423/440; 977/842; 502/416

(58) Field of Classification Search ............ 423/440, 423/447.5, 447.8, 447.3; 502/185, 416; 977/948, 977/842
See application file for complete search history.

(56) References Cited

U.S. PATENT DOCUMENTS

| 5,488,023 A | * | 1/1996 | Gadkaree et al. ............ 502/182 |
| 5,997,832 A | * | 12/1999 | Lieber et al. ................ 423/249 |
| 6,576,369 B1 | * | 6/2003 | Moriguchi et al. ....... 429/231.8 |

OTHER PUBLICATIONS

Chen, et al., Carbon nanotubes formed in graphite after mechanical grinding and thermal annealing, Appl. Phys. A 2003; 76: 633-636.*

* cited by examiner

*Primary Examiner*—Stanley Silverman
*Assistant Examiner*—Daniel C. McCracken
(74) *Attorney, Agent, or Firm*—George A. Seaby

(57) ABSTRACT

Carbon nanostructures for use as catalyst supports in hydrogen fuel cells are produced by mixing a carbon material with at least one transition metal such as iron and cobalt, subjecting the mixture thus produced to mechanical grinding, e.g. ball milling in a hydrogen atmosphere for a time sufficient for hydrogen to be absorbed into the mixture, and heating the mixture in an inert atmosphere at a temperature sufficient to crystallize at least one of the carbon material and carbide nanocrystals.

8 Claims, 3 Drawing Sheets

CARBON NANOSTRUCTURE CATALYST SUPPORT

BACKGROUND OF THE INVENTION

1. Field of the Invention

This invention relates to a method of producing carbon nanostructures for use as catalyst supports in fuel cells 2. Discussion of the Prior Art During the last few years, carbon nanostructures such as nanofibers and single or multi-walled nanotubes have received a lot of attention in the field of fuel cell research and development. The surface area, porosity and electromagnetic properties of such structures make them more suitable as catalyst supports in fuel cell electrode assemblies than carbon black powders.

Proton exchange membrane fuel cells (PEMFCs) have the highest power density when compared to other types of fuel cells. In order to improve fuel cell performance, reactant and catalytic material utilization must be optimized. PEMFCs rely on carbon-supported catalysts to produce the electrochemical reaction that generates such high power densities. In order to improve the electrochemical reaction rate, the catalyst should be as highly dispersed and as small as possible to expose the greatest surface area to the reactants. The catalyst layer usually consists of platinum crystallites with a mean diameter of a few nanometers highly dispersed on the surface of an amorphous carbon black powder.

One of the best catalyst performances in recent past was with a Pt loading of 0.1 to 0.2 mg/cm$^2$ for 20 wt. % Pt/C [see Z. Qi et al, J. Power Sources, 113, pp. 37-43 (2003)]. Recently, it was shown by T. Yoshitake et al [see Physica B, 323, pp. 124-126 (2002)] that using single walled carbon nanohorns instead of carbon black increases the power density of PEMFCs by improving catalyst dispersion, and that iron can be used instead of or with Pt as a catalyst at the cathode of PEMFCs [see H. Wang et al, J. Phys. Chem. B, 103 pp 2042-2049 (1999) and T. Todat et al, J. Electrochem. Chem., 460, pp 258-262 (1999)]. In general, methods used to produce carbon nanostructures are somewhat complicated. Accordingly, there is a need for a simple method of producing carbon nanostructures for use as fuel cell catalyst supports.

GENERAL DESCRIPTION OF THE INVENTION

The object of the present invention is to meet the above mentioned need by providing a relatively simple method of producing a novel carbon nanostructure which is an effective catalyst support.

Accordingly, the present invention relates to a method of producing carbon nanostructures comprising the steps of:

(a) mixing a carbon material with at least one transition metal to produce a mixture;

(b) subjecting the mixture thus produced to mechanical grinding in a hydrogen atmosphere for a time sufficient for hydrogen to be absorbed onto the carbon material; and (c) heating the mixture in an inert atmosphere at a temperature sufficient to crystallize at least one of the carbon material and carbide nanocrystals.

DESCRIPTION OF PREFERRED EMBODIMENTS

More specifically, in accordance with a first step in the method set out above, carbon and transition metal such as iron, nickel, cobalt, titanium and/or vanadium are mixed with carbon, and the resulting mixture is subjected to ball milling in an iron crucible under a hydrogen pressure of about 1 MPa. Preferably, before mixing the carbon and transition metal(s), the carbon is treated under vacuum or with a flowing inert gas to remove contaminants. In one embodiment of the invention, between the mixing and ball milling steps, the mixture was placed in a reaction vessel, the vessel was evacuated, and pure $H_2$ was introduced into the vessel at a pressure of 0.1 to 21 MPa. The ball milling can be effected using any type of milling machine. Ball milling breaks the crystal structures of the elements to form nanocrystalline and amorphous grains, the hydrogenation of carbon, and the mechanical alloying of carbide and/or transition alloys. The hydrogenation of carbon and eventually the production of methane is catalyzed by the presence of transition metal. The hydrogen concentration in the metal reaches up to about 4.5 wt percent after a milling time of 48 hours. Pure graphite ball milled in an inert atmosphere for 150 hours and then heated at 1400° C. for 6 hours results in nucleation and growth of carbon nanotubes. Some Fe in the sample comes from the crucible walls. In one embodiment, the addition of Co to the mixture alloys with Fe to produce FeCo and $Fe_3CO_7$ crystallites, thereby preventing later formation of iron carbides. Ball milling is effected under a hydrogen atmosphere which creates C—H covalent bonds.

In a second step of the process, the sample is heated in a quartz tube at temperatures ranging from 500 to 1000° C. for one hour under an inert atmosphere, in this case helium or argon. During heating, pure metal or alloy crystallizes and catalyzes methane production from previously hydrogenated carbon. The subsequent catalytic decomposition of methane on nano-crystalline carbide or transition metal synthesizes porous carbon nanostructures. The addition of transition metals meets several goals. The metals catalyze the hydrogenation of carbon and the subsequent production of methane, and catalyze the decomposition of methane on nanocrystals to produce the carbon nanostructures. The use of transition metals substantially reduces the milling and heat treating time as well as the heat treating temperature.

After each step of the process, X-ray diffraction analyses are performed to characterize sample structures and determine the average Fe crystallite diameter, Fe being the main metal constituent. At the end of the process, atomic absorption spectra are obtained to evaluate the amount of C, Fe and Co in the catalyst composition. TEM images are taken to determine whether carbon nanostructures are present in the sample and whether the metal crystallites are well distributed. BET analysis are performed to obtain the specific surface area and porosity of the product. Specific electrical conductivity of the samples is measured with a low frequency LCR impedance meter with the samples compressed in a hollow acrylic cylinder and sandwiched between two metal plungers.

EXAMPLES

Several samples were prepared containing various amounts of carbon, iron and cobalt, and the mean crystallite diameters were determined by X-ray diffraction analysis. The exact composition of each sample was determined by atomic mass spectroscopy. The specific conductivity of the samples heated at different temperatures (except for sample number 4, which was purified, i.e. the transition metals were omitted) was also determined. The metal composition of eleven samples and the above listed properties thereof are set out in the following table.

TABLE

| Sample No | T (° C.) | d (Å) | Co wt % | Fe wt % | C wt % | σ (S/cm) |
|---|---|---|---|---|---|---|
| 1 | 800 | 367 | 13.3 | 73.4 | 13.2 | 1.150 |
| 2 | 600 | 294 | 15.0 | 67.7 | 17.3 | 1.272 |
| 3 | 700 | 343 | 4.94 | 63.8 | 31.3 | 0.992 |
| 4 | 700 | — | — | — | 100 | 0.821 |
| 5 | 1000 | 332 | 17.2 | 59.0 | 23.8 | 0.609 |
| 6 | 500 | 271 | 18.4 | 37.5 | 44.1 | 0.007 |
| 7 | 700 | 401 | 6.2 | 92.1 | 1.7 | 2.360 |
| 8 | 800 | 302 | 5.65 | 32.8 | 61.5 | 0.771 |
| 9 | 675 | 332 | 14.2 | 59.3 | 26.5 | 2.424 |
| 10 | 700 | 334 | 11.0 | 44.3 | 44.7 | 0.848 |
| 11 | 600 | 172 | 23.3 | 20.0 | 56.7 | 0.011 |

In Table 1, T is the temperature to which sample was heated, d is the diameter of particles in angstroms and σ is the specific electrical conductivity of the samples in siemens (S) per square centimeter.

From the results set out in the above table, it has been established that a temperature of 600° C. is required to initiate the production of carbon nanostructures. The average metal cluster diameter varies from 294 to 401 Å for the electrically conducting samples.

BRIEF DESCRIPTION OF THE DRAWINGS

In the accompanying drawings:

Referring to the drawings, FIG. 1 shows the presence of carbon nanostructures and metal dispersion in sample number 2.

The BET analysis of sample number 3 gives a specific surface of 49 m$^2$/g. The specific surface of sample number 4 is 246 m$^2$/g. This increase in specific surface comes mainly from the external carbon surface and from the meso porous structure. The meso porous volume up to a pore dimension of 30 nm is evaluated at 0.51 cm$^3$/g. The analysis of the N isotherms suggests that samples prepared in accordance with the method of the present invention have good macro porous structures. A large pore volume means that mass transfer losses in PEMFCs should be reduced thus resulting in higher power densities.

Figure 5:
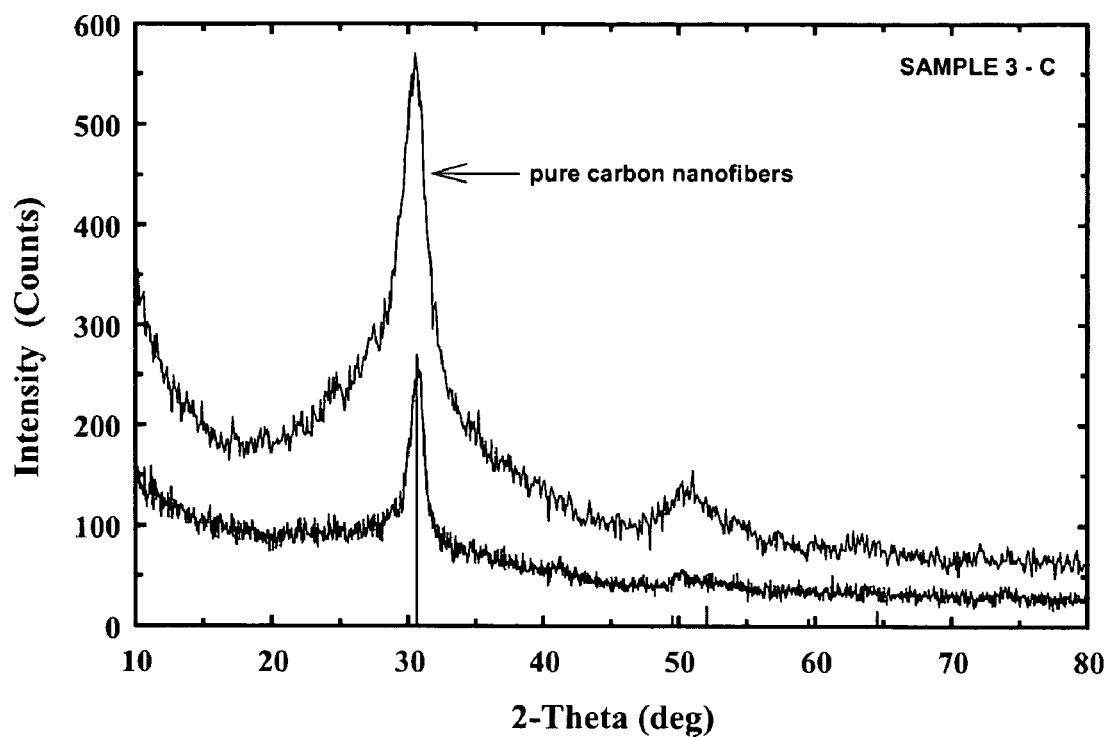
FIG. 5 is a graph resulting from the X-ray diffraction analyses of sample number 4 and pure carbon nanofibers.
Figure 6:
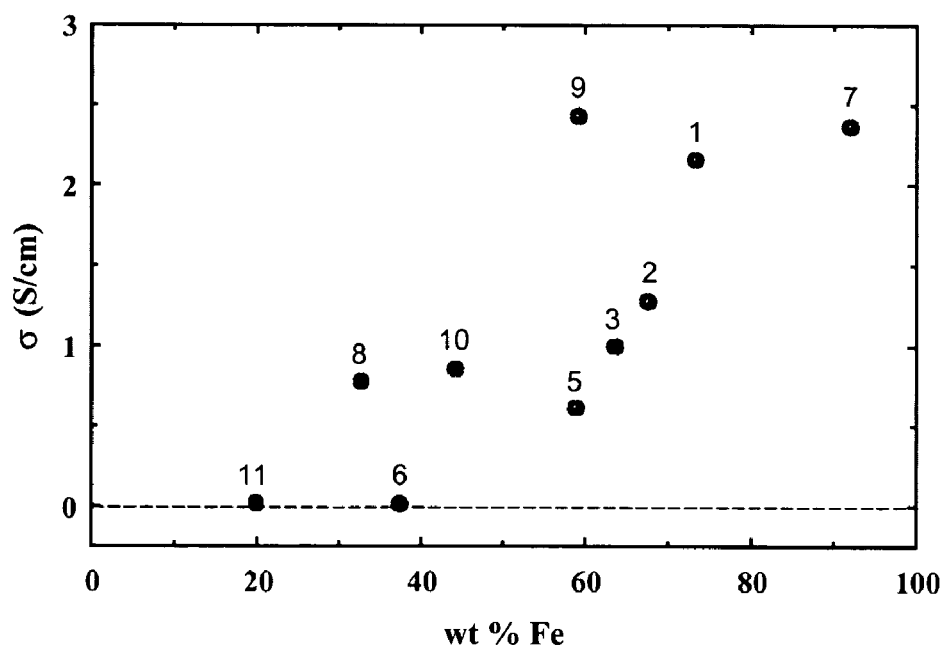
FIG. 6 is a graph of the specific electrical conductivity versus the iron content of samples 1 to 3 and 5 to 11.

Referring to FIG. 5, it will be noted that the specific conductivities of the samples prepared in accordance with the present invention are of the same order of magnitude as commercially available carbon black powders [about 1 S/cm$^2$ for Vulcan XC-72—see D. Pantea et al, Carbon, 39, pp. 1147-1158 (2001)].

The metal content of sample number 3 was reduced to zero in order to measure the electrical conductivity of the carbon itself the small difference in conductivity between samples 3 and 4 proves that the metal content of the samples increases the conductivity by only a small amount, even with an Fe loading of 63.8 wt %.

Figure 1:
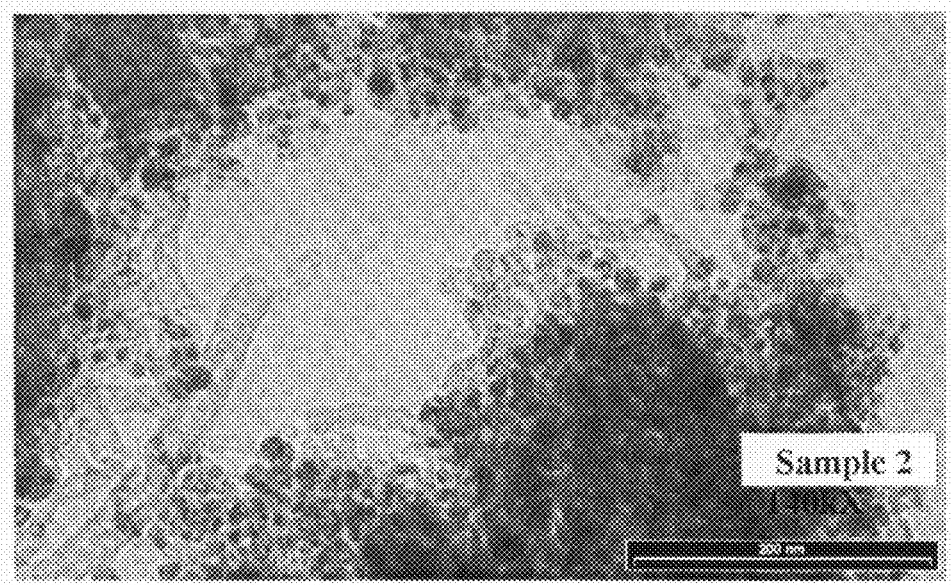
FIG. 1 is a TEM image for sample number 2.
Figure 2:
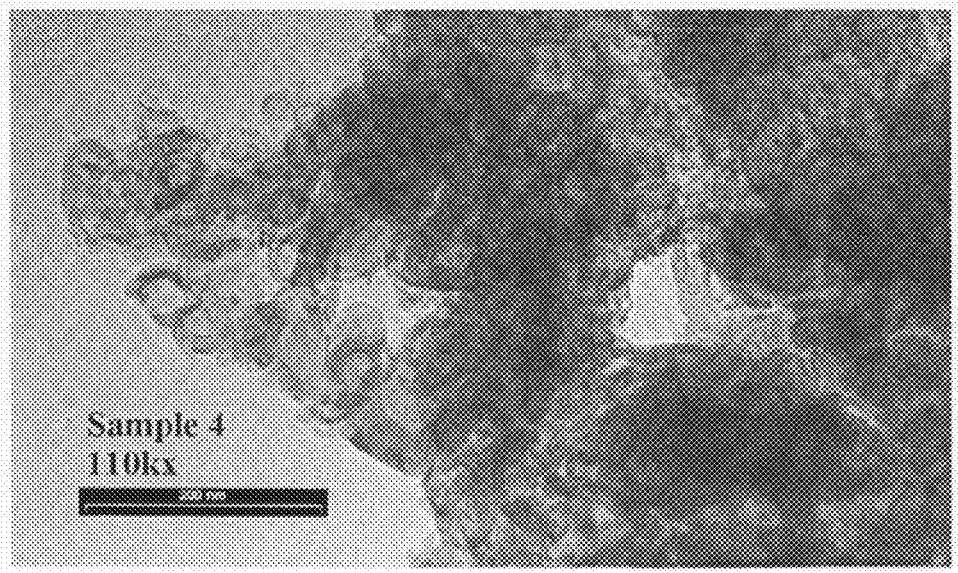
FIG. 2 is a TEM image of sample number 4 from which transition metals have been omitted and only carbon nanostructures are present.
Figure 3:
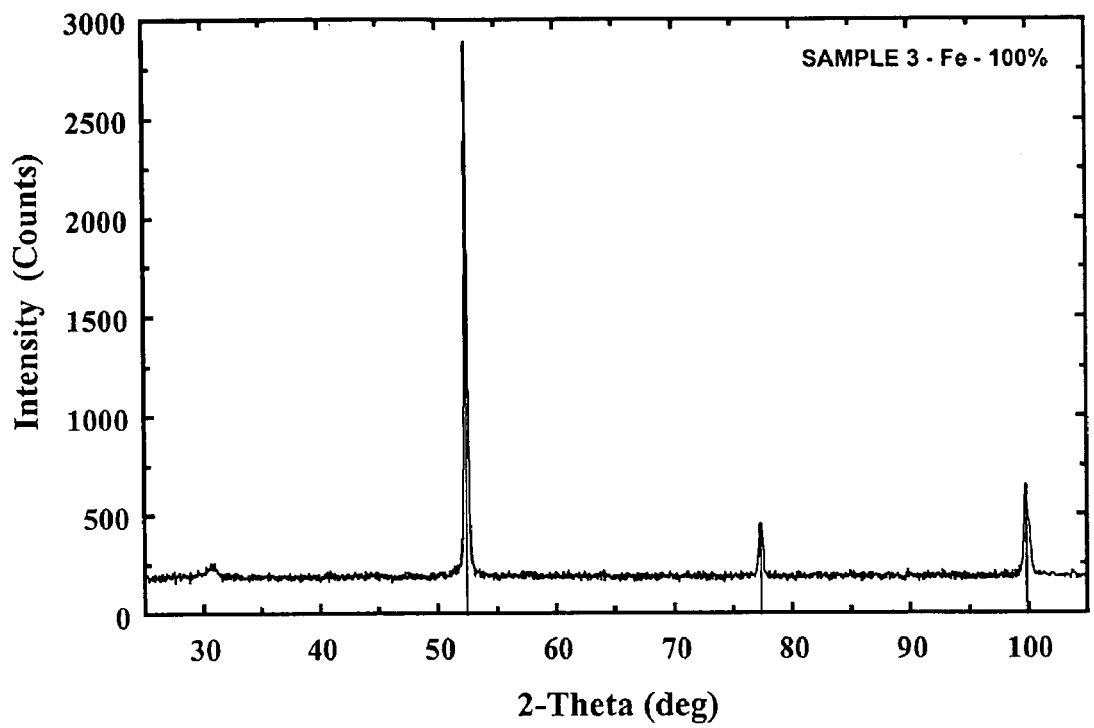
FIG. 3 is a graph resulting from the X-ray diffraction analysis of the Fe crystal structure of sample number 3.
Figure 4:
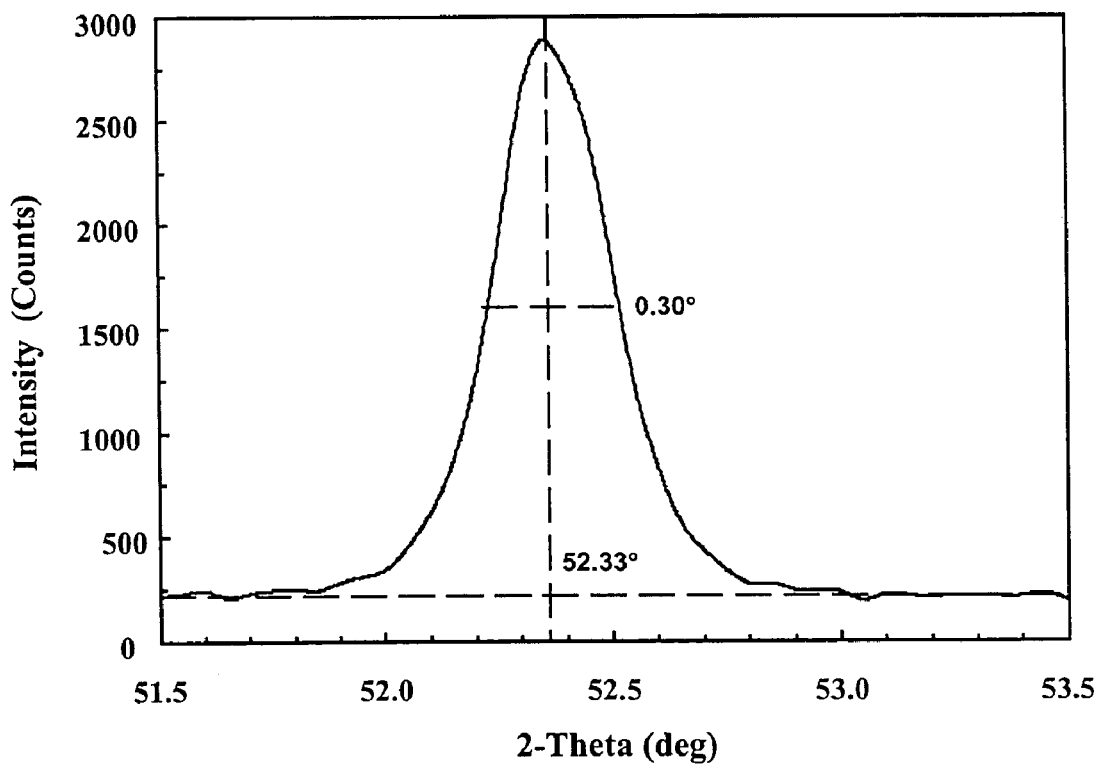
FIG. 4 is a magnification of the main peak of FIG. 3 which is used to calculate the average crystallite diameter using Sherrer's formula.

Thus, there has been described a simple method for producing carbon powders containing amorphous and structured carbons, which can be used as catalyst supports for PEMFCs. The TEM images (FIGS. 1 and 2) show that metal clusters are well dispersed and that a large number of carbon nanostructures were created. The samples prepared in accordance with the method described herein contain carbon nanostructures having sufficient electrical conductivity for use as catalyst supports for proton exchange membrane fuel cells.

We claim:

1. A method of producing carbon nanofibers and single or multiwalled nanotubes comprising the steps of:
   (a) mixing a carbon material with at least one transition metal to produce a mixture;
   (b) heating the mixture thus produced with hydrogen gas at a pressure of 0.1 to 21 Mpa;
   (c) subjecting the mixture obtained in step (b) to mechanical ball milling in a hydrogen atmosphere for a time sufficient for hydrogen to be absorbed into the carbon material; and
   (d) heating the mixture in an inert atmosphere at a temperature sufficient to crystallize at least one of the carbon material, carbide and metallic nanocrystals.

2. The method of claim 1, wherein, before mixing the carbon material with the at least one transition metal, the carbon material is subjected to a vacuum or treated with a flowing inert gas to remove contaminants.

3. The method of claim 1, wherein the transition metal is selected from the group consisting of iron, cobalt, nickel, titanium and vanadium.

4. The method of claim 1, wherein the carbon material is mixed with iron and cobalt.

5. The method of claim 2, wherein the inert gas is helium or argon.

6. The method of claim 1, wherein the mixture is heated at a temperature of 600 to 1000° C.

7. The method of claim 3, wherein the mixture is heated at a temperature of 600 to 1000° C.

8. The method of claim 1, wherein the carbon material is selected from the group consisting of natural graphite and activated carbon.

* * * * *